W. J. SONKA.
MILK COOLER.
APPLICATION FILED FEB. 18, 1909.

934,227.

Patented Sept. 14, 1909.

Witnesses
J. H. Crawford
John A. Donegay

Inventor
William J. Sonka
By Chandler & Chandler
Attorney

UNITED STATES PATENT OFFICE.

WILLIAM J. SONKA, OF CEDAR RAPIDS, IOWA.

MILK-COOLER.

934,227.

Specification of Letters Patent.   Patented Sept. 14, 1909.

Application filed February 18, 1909. Serial No. 478,623.

*To all whom it may concern:*

Be it known that I, WILLIAM J. SONKA, a citizen of the United States, residing at Cedar Rapids, in the county of Linn, State of Iowa, have invented certain new and useful Improvements in Milk-Coolers; and I do hereby declare the following to be a full, clear, and exact description of the invention, such as will enable others skilled in the art to which it appertains to make and use the same.

This invention relates to improvements in apparatus for cooling milk and cream.

It has for its object the provision of a device of that kind designed to impart a blast of cold air to a moving column of milk or cream whereby the temperature of the latter will be reduced and at the same time freed from impurities.

A further object is the provision of a device which is exceedingly simple in structure and comparatively inexpensive to manufacture, the parts being so arranged that the danger of derangement will be reduced to a minimum.

With these and other objects in view that will more fully hereinafter appear, the present invention consists in certain novel details of construction and arrangement of parts, hereinafter fully described illustrated in the accompanying drawings, and more particularly pointed out in the appended claim. It being understood that various changes in the form, proportion, size and minor details of the device may be made without departing from the spirit or sacrificing any of the advantages of the invention.

Figure 1:
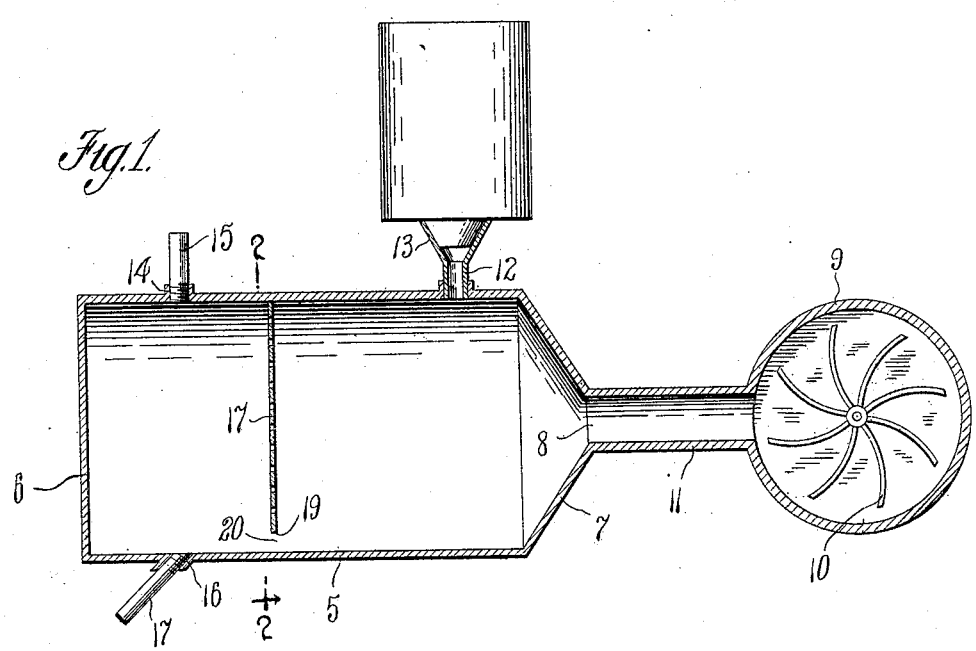
Figure 2:
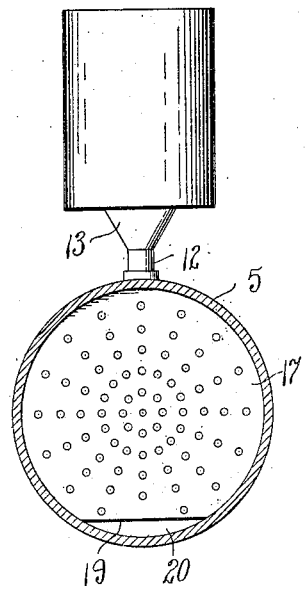

In the accompanying drawings forming part of the specification: Figure 1 is a longitudinal sectional view of the device. Fig. 2 is a vertical section on the line 2—2 on Fig. 1.

Similar numerals of reference are employed to designate corresponding parts throughout.

The device consists essentially in a tank, into which is fed milk or cream from a suitable receptacle, the liquid falls in the path of a blast and is driven against a perforated impinging surface and atomized. This breaking up of the particles releases the impure gases which escape with the air to a suitable opening, the liquid gravitating to the bottom of the tank to escape through suitable opening.

The tank 5 is preferably of metal and oblong in shape, being closed at one end, as shown at 6, while the opposite end 7 is bulged at its central portion and provided with a central opening 8. A fan casing 9, is shown disposed at a suitable distance from the bulged end of the tank 5 and is interiorally provided with a rotary fan 10. At that side of the fan casing adjacent the bulged end of the tank an opening is made for the reception of one end of a channel or pipe 11, the opposite end of which enters the central opening 8 in the bulged end of the tank.

The tank is provided on its upper face with an outlet pipe 12 terminating in a flared mouth 13 of sufficient size to receive the mouth of the vessel from which the liquid is to be taken. It is to be understood that any method of supporting the last named vessel in position to discharge its contents may be employed and the present invention lays no claim to this construction.

Formed in the upper face of the tank 5 adjacent the closed end 6 and remote from the inlet 12 is an outlet opening 14, surrounded at its upper edge by an outlet pipe 15, the function of which is to provide an opening for the escape of the air blasted into the tank by means of the fan 10. Disposed on the lower side of the tank 5 and directly beneath the air outlet opening 14 is a similar opening 16 from which leads a pipe 17, the function of which is to carry off the liquid from the tank.

With the construction thus far described, it can be seen when the fan is in operation and liquid is directed through the inlet opening 12 it will pass through the cool blast generated by the fan whereby its temperature will be lowered before making escape through the outlet 17.

In order to more completely cool the entering milk by breaking it into small particles and holding the said particles for a space of time in the path of the blast, the following construction is employed: By referring now to figures 1 + 2 it will be seen that the tank is interiorly provided with a screen 17 conforming to the cross section shape of the tank and of a size to snugly fit within the tank. The screen 17 may be formed of any suitable material and is disposed in a vertical plane and arranged at substantially the horizontal center of the tank and intermediate the inlet pipe 12 and outlet pipe 15. The lower edge of the screen is cut away as shown at 19 so as to form with the lower side of the tank 5, an opening 20. Thus it will be seen when the falling liquid comes in contact with the air blast it will impinge against the screen 18 and by the latter broken into small particles a portion of which will enter through meshes of the screen and impinge against the rear wall 6, those particles which do not pass through the screen will gravitate to the bottom of the tank and through the opening 20, making their exit with the first named particles through the opening 16.

Thus it can be seen I have provided a device which will perform both a cooling and purifying function.

Having thus described my invention, what is claimed as new, is:

An apparatus for cooling milk comprising a tank having a reduced neck portion at one end constituting an air inlet opening and provided on its upper side and adjacent its opposite ends with liquid and air inlet and outlet openings and further provided adjacent the end remote from the neck with liquid outlet openings arranged below and in alinement with the air outlet, and a vertically disposed screen secured to the upper and opposite sides of the tank between the liquid inlet and air outlet openings, the lower edge of said screen being straight and forming the side of an arcuate opening with the lower side of said tank.

In testimony whereof, I affix my signature, in presence of two witnesses.

WILLIAM J. SONKA.

Witnesses:
  WM. M. KACENA,
  GEO. W. SWAB.